United States Patent
Zhou et al.

(10) Patent No.: US 7,878,750 B2
(45) Date of Patent: Feb. 1, 2011

(54) ROTATABLE AND ARTICULATED MATERIAL HANDLING APPARATUS

(75) Inventors: Zhendong (Mike) Zhou, Mequon, WI (US); Michael Yanacek, Oshkosh, WI (US); Jon Morrow, Neenah, WI (US); James Gullickson, Kaukauna, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1011 days.

(21) Appl. No.: 10/549,463

(22) PCT Filed: Mar. 17, 2004

(86) PCT No.: PCT/US2004/008080

§ 371 (c)(1),
(2), (4) Date: Jun. 27, 2006

(87) PCT Pub. No.: WO2004/083081

PCT Pub. Date: Sep. 30, 2004

(65) Prior Publication Data

US 2007/0172342 A1    Jul. 26, 2007

Related U.S. Application Data

(60) Provisional application No. 60/455,149, filed on Mar. 17, 2003.

(51) Int. Cl.
*B60P 1/28* (2006.01)
(52) U.S. Cl. .................................................. 414/498
(58) Field of Classification Search ............ 414/498, 414/546, 553, 554, 555
See application file for complete search history.

(56) References Cited

U.S. PATENT DOCUMENTS

| | | | |
|---|---|---|---|
| 3,964,625 A | | 6/1976 | Wirz |
| 4,274,329 A | | 6/1981 | Weyer |
| 4,313,367 A | | 2/1982 | Weyer |
| 4,342,257 A | | 8/1982 | Weyer |
| 4,373,426 A | | 2/1983 | Weyer |
| 4,553,899 A | * | 11/1985 | Magni .................... 414/629 |
| 4,569,454 A | * | 2/1986 | Sterner .................. 212/259 |
| 4,637,623 A | * | 1/1987 | Bubik ..................... 280/402 |
| 4,667,528 A | | 5/1987 | Weyer |
| 4,678,392 A | * | 7/1987 | Capers et al. .......... 414/563 |

(Continued)

FOREIGN PATENT DOCUMENTS

DE      94 21 147 U1    8/1995

(Continued)

OTHER PUBLICATIONS

International Search Report for PCT/US2004/008080, date of mailing Sep. 20, 2004, 4 pages.

*Primary Examiner*—Charles A Fox
(74) *Attorney, Agent, or Firm*—Foley & Lardner LLP

(57) ABSTRACT

A material handling apparatus for mounting on a support structure. The material handling apparatus comprises a telescopic riser portion coupled to the support structure. A telescopic boom portion is coupled to the riser portion. A telescopic jib portion is coupled to the riser portion. A hook is coupled to the jib portion. A control apparatus is coupled to each of the riser, boom, and jib portions. Wherein, each of the telescopic portions can be independently, selectively moved in a push-pull mode to manipulate material.

7 Claims, 7 Drawing Sheets

U.S. PATENT DOCUMENTS

| | | | |
|---|---|---|---|
| 4,775,288 A * | 10/1988 | Dimitriu | 414/708 |
| 4,798,051 A | 1/1989 | Foote | |
| 4,798,509 A * | 1/1989 | Bubik | 414/563 |
| 4,802,811 A | 2/1989 | Nijenhuis | |
| 4,941,546 A * | 7/1990 | Nist et al. | 182/17 |
| 4,964,778 A * | 10/1990 | Muto et al. | 414/700 |
| 5,054,372 A | 10/1991 | Weyer | |
| 5,102,284 A * | 4/1992 | Raisio | 414/498 |
| 5,102,377 A | 4/1992 | Spanski | |
| 5,106,255 A * | 4/1992 | Motoda et al. | 414/540 |
| 5,108,247 A * | 4/1992 | Vlaanderen | 414/421 |
| 5,163,800 A | 11/1992 | Raisio | |
| 5,267,504 A | 12/1993 | Weyer | |
| 5,309,816 A | 5/1994 | Weyer | |
| 5,326,216 A * | 7/1994 | Russ | 414/563 |
| 5,447,095 A | 9/1995 | Weyer | |
| 5,477,772 A | 12/1995 | Weyer | |
| 5,542,808 A * | 8/1996 | Chiron et al. | 414/498 |
| 5,597,281 A * | 1/1997 | Croiset et al. | 414/498 |
| 5,601,393 A | 2/1997 | Waldschmitt | |
| 5,609,090 A | 3/1997 | Weyer | |
| 5,671,652 A | 9/1997 | Weyer | |
| 5,709,522 A * | 1/1998 | Cullum | 414/563 |
| 5,967,735 A * | 10/1999 | Smart et al. | 414/498 |
| 6,139,250 A * | 10/2000 | Nolasco | 414/563 |
| 6,158,947 A * | 12/2000 | Goiran et al. | 414/500 |
| 6,213,706 B1 * | 4/2001 | Christenson | 414/408 |
| 6,257,818 B1 * | 7/2001 | Wiemeri et al. | 414/23 |
| 6,276,888 B1 * | 8/2001 | Rubio | 414/406 |
| 6,350,098 B1 * | 2/2002 | Christenson et al. | 414/408 |
| 6,416,272 B1 * | 7/2002 | Suehiro et al. | 414/546 |
| 6,565,307 B1 * | 5/2003 | Niemela | 414/546 |
| 6,705,823 B2 * | 3/2004 | Bohata | 414/546 |
| 6,962,473 B2 | 11/2005 | Scranton et al. | |
| 7,153,082 B2 * | 12/2006 | Nolasco | 414/563 |
| 7,246,684 B2 * | 7/2007 | Bean | 187/224 |
| 2002/0146306 A1 | 10/2002 | Morrell | |
| 2005/0220589 A1 | 10/2005 | Covington et al. | |
| 2008/0056875 A1 * | 3/2008 | Romigh et al. | 414/685 |
| 2008/0237285 A1 | 10/2008 | Calliari | |

FOREIGN PATENT DOCUMENTS

| | | |
|---|---|---|
| EP | 0 634 304 A1 | 1/1995 |
| JP | 8 132364 | 5/1996 |
| NL | 7 702 392 | 9/1978 |

\* cited by examiner

ROTATABLE AND ARTICULATED MATERIAL HANDLING APPARATUS

CROSS-REFERENCE TO RELATED APPLICATION

This application claims the benefit of U.S. Provisional Application 60/455,149, filed Mar. 17, 2003, which is incorporated herein by this reference.

BACKGROUND OF THE INVENTION

The present invention is concerned with equipment for loading and unloading cargo and more particularly for a rotatable and articulated material handling apparatus mounted on a vehicle.

Equipment used for loading and unloading material, such as cargo containers, typically utilize an L-shaped, hooked arm that engages the container and pulls it up onto a vehicle. Offloading occurs in the reverse of such procedure to offload a container from a vehicle. Such container manipulating equipment, although may be articulated to a certain degree, more conventionally are fixed with the movable hooked arm that moves in a high arc during at least a portion of the cargo loading and unloading procedure. Such high arc movement prevents a vehicle equipped with such a cargo handling equipment from loading or unloading an aircraft, such as a C-130 cargo aircraft.

A typical procedure for loading or unloading a C-130 aircraft requires a vehicle carrying the container to offload the container outside of the aircraft and then requires a second piece of equipment, such as a crane or a forklift truck, to move the container to the aircraft and loading into the aircraft. Such multiple handling is expensive and time consuming.

Thus there is a need for a material handling system that has an operation range profile that will allow the loading and unloading of aircraft without the need for additional equipment. There is further a need for a material handling system that can load or unload the material from the side of a vehicle on which the apparatus is mounted. There is further need for the material handling apparatus that can be used in a push-pull mode.

SUMMARY

There is provided a material handling apparatus for mounting on a support structure. The material handling apparatus comprises a telescopic riser portion coupled to the support structure. A telescopic boom portion is coupled to the riser portion. A telescopic jib portion is coupled to the riser portion. A hook is coupled to the jib portion. A control apparatus is coupled to each of the riser, boom, and jib portions. Wherein, each of the telescopic portions can be independently, selectively moved in a push-pull mode to manipulate material.

There is also provided a vehicle comprising a support structure coupled to a weight bearing element and a material handling apparatus. The material handling apparatus is coupled to the support structure. The material handling apparatus comprises a telescopic riser portion coupled to the support structure. The telescopic boom portion is coupled to the riser portion. A telescopic jib portion is coupled to the riser portion. The hook is coupled to the jib portion. A control apparatus is coupled to each of the riser, boom and jib portions. Wherein, each of the telescopic portions can be independently, selectively moved in a push-pull mode to manipulate material. In an another embodiment, the vehicle can include a rotational assembly coupled to the support structure and the riser portion. The rotation assembly is rotatable at least 360°.

A SUMMARY AND DETAILED DESCRIPTION OF EXEMPLARY EMBODIMENTS

Figure 1:
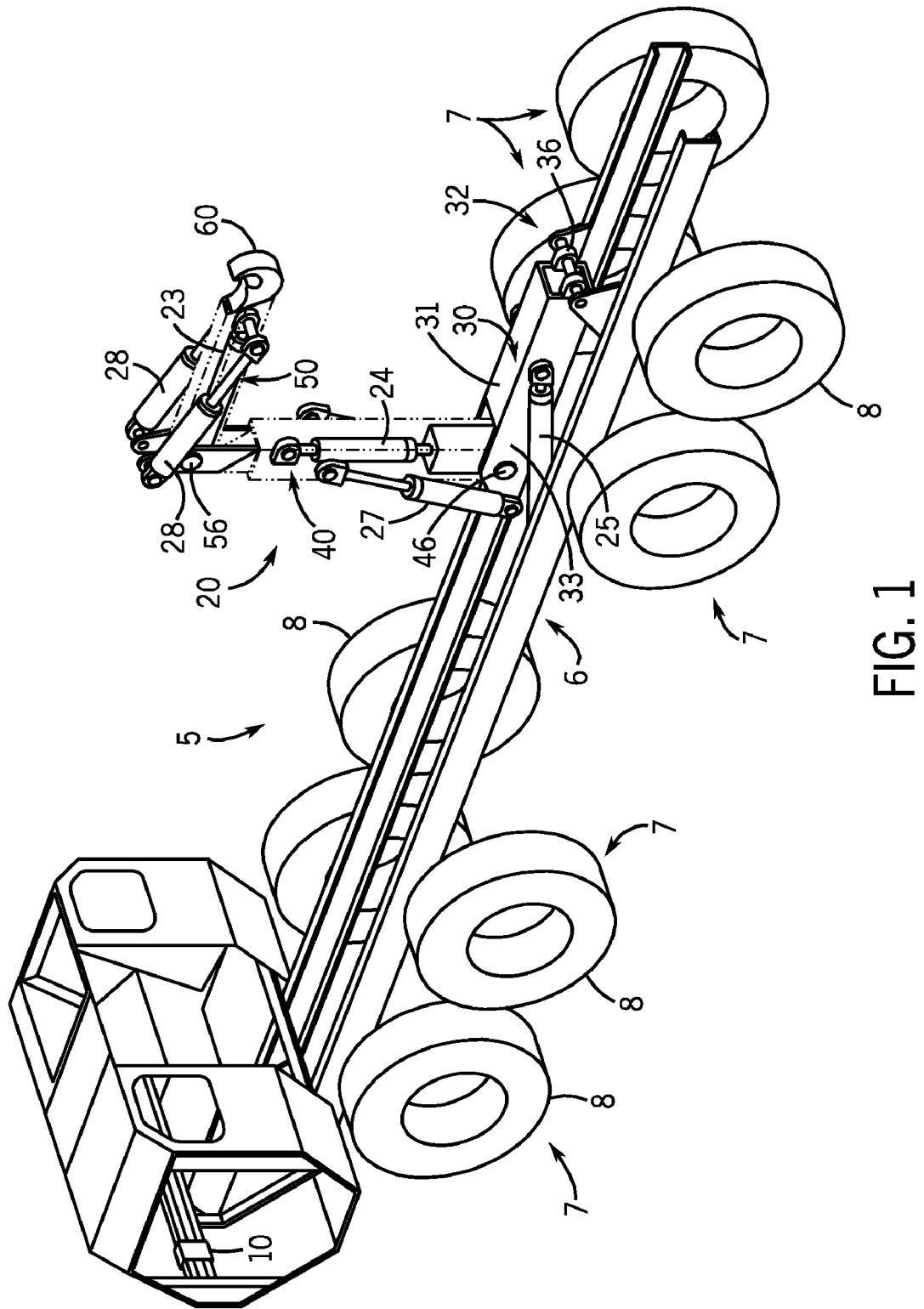
FIG. 1 is a perspective view of an exemplary embodiment of an articulated material handling apparatus pivotally mounted on a vehicle.

Before beginning a detailed description of exemplary embodiments, several general comments are warranted about the applicability and scope of the present invention.

The vehicle illustrated in FIGS. 1-6 is a truck, however, it should be understood that the vehicle on which the material handling apparatus 20 is mounted can be a trailer or other suitable vehicle. The Figures also illustrates a weight bearing element 7 as being a wheel 8. It should be understood that multiple wheel combinations are within the scope of the present disclosure. For instance, a four or six wheel vehicle can also be used to mount the material handling apparatus 20. It is also contemplated that the weight bearing elements 7 can be a continuous track mounted on wheels. It is also contemplated that the vehicle 5 can be on a track system for instance, railroad or monorail track.

FIGS. 1-6 illustrate actuators 25, 27 and 28 and telescopic actuators 23, 24 and 26. It should be understood that such apparatus can be hydraulic, pneumatic, mechanical, or electrical. Suitable control apparatus motors, pumps, switches, plumbing and wiring components of conventional and suitable kinds can be coupled to the several actuators 25, 27 and 28 and telescopic actuators 23, 24 and 26 to control the motion of such devices. Such control apparatus 10 can be mounted at convenient locations on the vehicle, for example in a cab of the vehicle or at an operator station located on the vehicle. It is also contemplated that a control apparatus remote from the vehicle 5 can be used, for example, tethered to the vehicle or in communication with the vehicle by radio or light waves.

Figure 6:
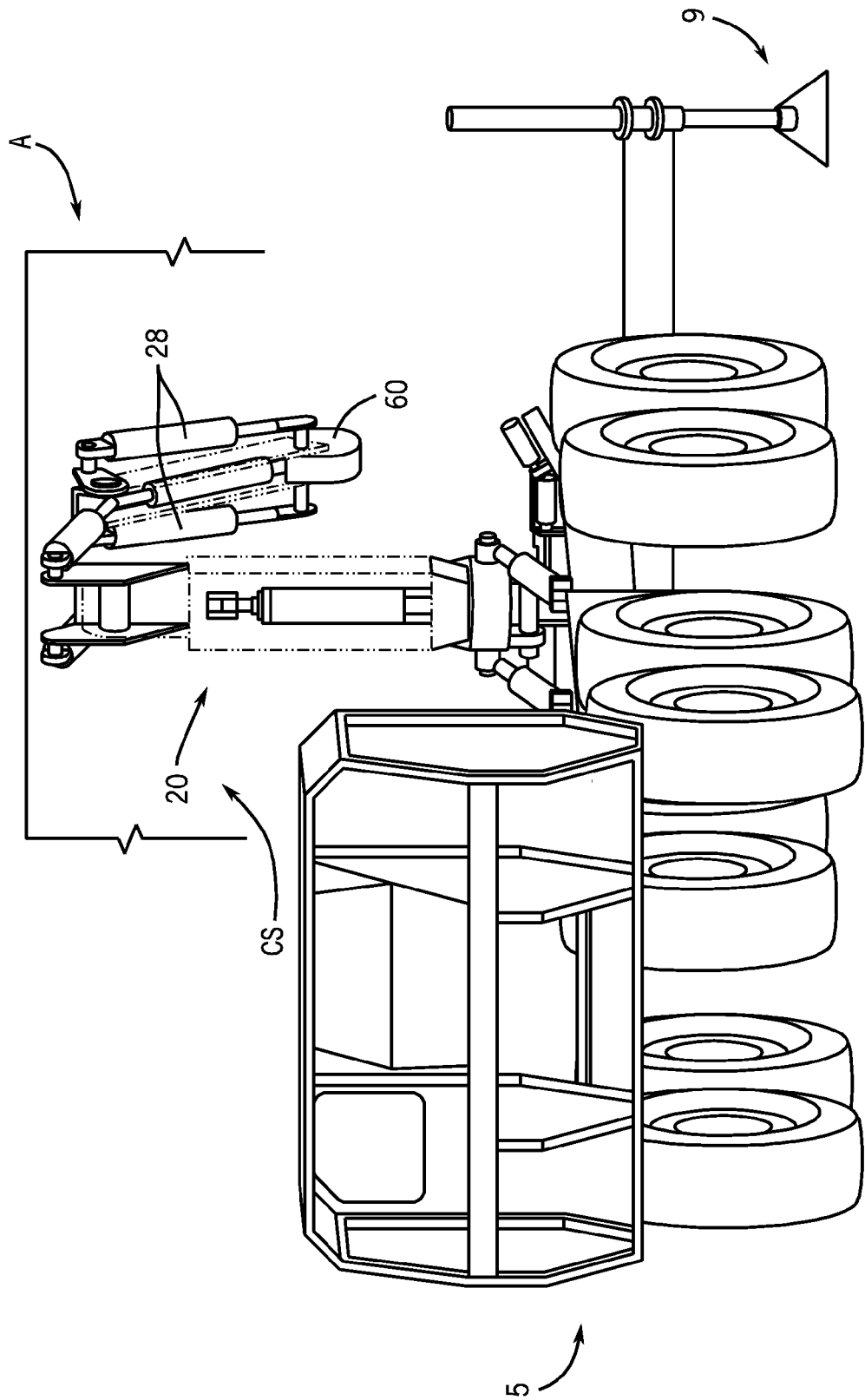
FIG. 6 is a perspective view of the material handling system illustrated in FIG. 2 with the boom portion and a jib portion extending into a cargo space of an aircraft.

FIG. 6 illustrates the material handling apparatus 20 mounted on a vehicle 5 as extending into an aircraft A, for example, a C-130. However, it is also contemplated that other types of aircraft can be loaded or unloaded with the present material handling apparatus 20. It is also contemplated that other types of vehicles 5, for example, a railroad car or semi-trailer can be loaded or unloaded by the present material handling apparatus 20.

Referring to the FIGS. 1-6, FIG. 1 illustrates an exemplary embodiment of a material handling apparatus 20 pivotably mounted on a support structure 6 of the vehicle 5. It is important to note that the pivoting range can be more than 90 degrees, so that the riser axis can be in either vertical direction or horizontal direction relative to the vehicle 5. The material handling apparatus 20 includes a riser portion 30, a boom portion 40, a jib portion 50 and a hook 60.

The riser portion 30 includes a riser pivot assembly 32. A plurality of lugs 36 are coupled to the riser portion 30 with a pin 34 engaging the lugs 36 and the support structure 6 of the vehicle 5. It should be understood that other suitable coupling assemblies can be utilized at either a fixed or movable location (translating along the support structure) is contemplated. The riser portion 30 includes a riser base portion 31 and a riser fly portion 33 coupled together by a telescopic actuator 26. It should be understood that telescopic assemblies with more than base and fly portions are contemplated, for example additional extendable portions can be coupled to the riser base, and fly portions. The assemblies perform a telescopic function with a telescopic cylinder, a pulley assembly and flexible member such as a rope, chain or belt.

Coupled to one end of the riser portion 30 is a boom portion 40. A boom pivot pin 46 can be used to couple the boom portion 40 to the riser portion 30. Articulation of the boom portion is provided by actuators 27. As illustrated in FIG. 1, an actuator 27 is coupled to the boom portion 40 and the riser portion 30. More than one actuator 27 can be used. The boom portion 40, includes a boom base portion 42 and a boom fly portion 44 which portions are coupled together with a telescopic actuator 24. Such construction allows the boom fly portion 44 to extend from the boom base portion 42 in a telescopic manner, thereby extending the reach of the boom portion 40. It should be understood that telescopic assemblies with more than base and fly portions are contemplated.

Figure 7:
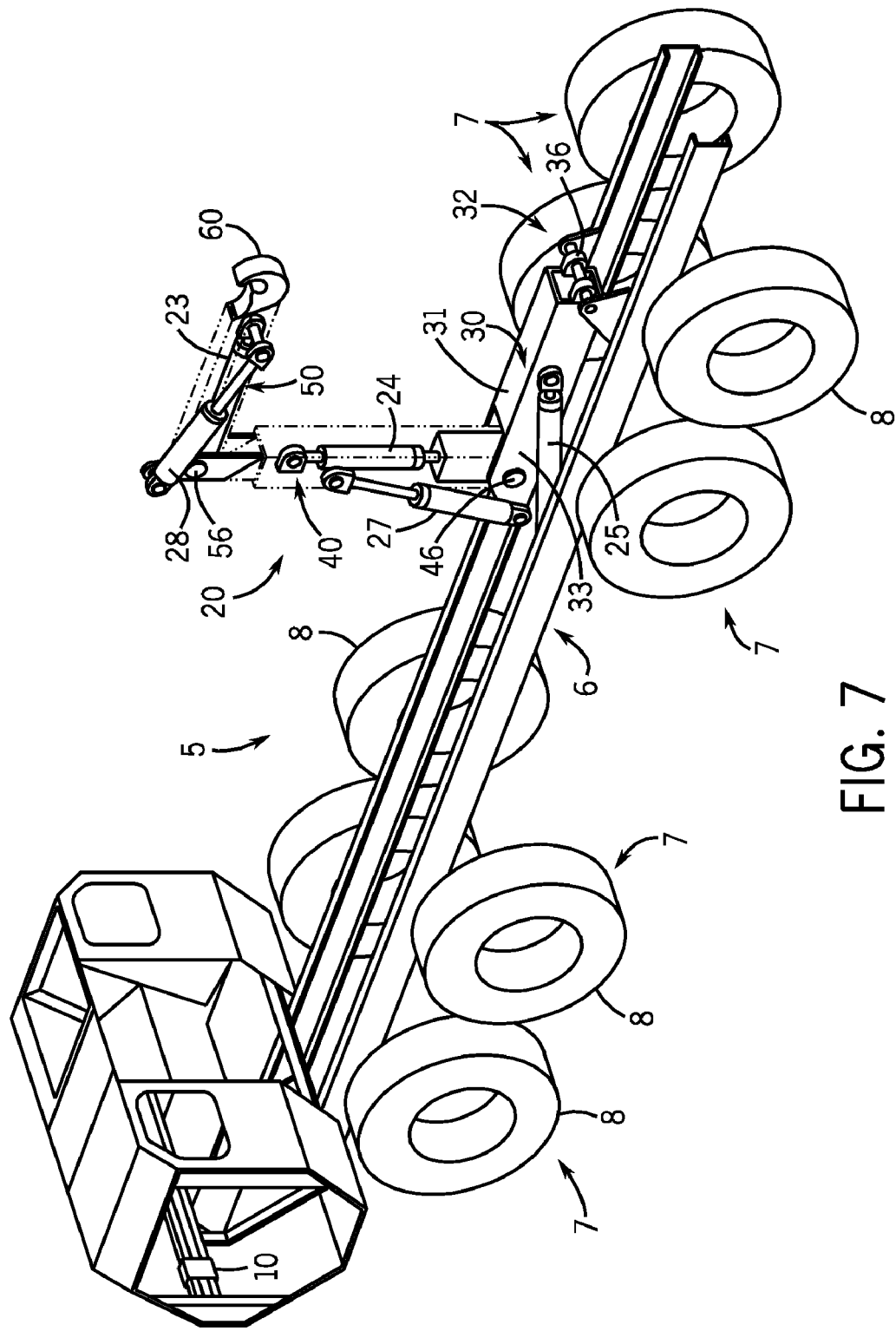
FIG. 7 is a perspective view of another exemplary embodiment of an articulated material handling apparatus pivotally mounted on a vehicle.

A jib portion 50 is coupled to one end of the boom portion 40. A jib portion 50 includes a jib base section 52 and a jib fly section 54. The jib base section 52 is coupled to the jib fly portion 54 by a telescopic actuator 23. It should be understood that as described above telescopic assemblies with more than base and fly portions are contemplated. Articulation of the jib portion 50 is provided by actuators 28 coupled to the jib portion 50 and the boom portion 40. One end of the jib portion is coupled to a hook 60. The hook 60 can be articulated by suitable actuator coupled to the hook and jib portion 50. Referring to FIG. 7, a vehicle 5 having a material handling apparatus 20 is shown according to an exemplary embodiment. The material handling apparatus 20 shown in FIG. 7 includes a first hydraulic actuator 25 coupled to support structure 6 and riser 30, a second hydraulic actuator 27 coupled to riser 30 and boom 40 and a third hydraulic actuator 28 coupled to boom 40 and jib 50.

Figure 2:
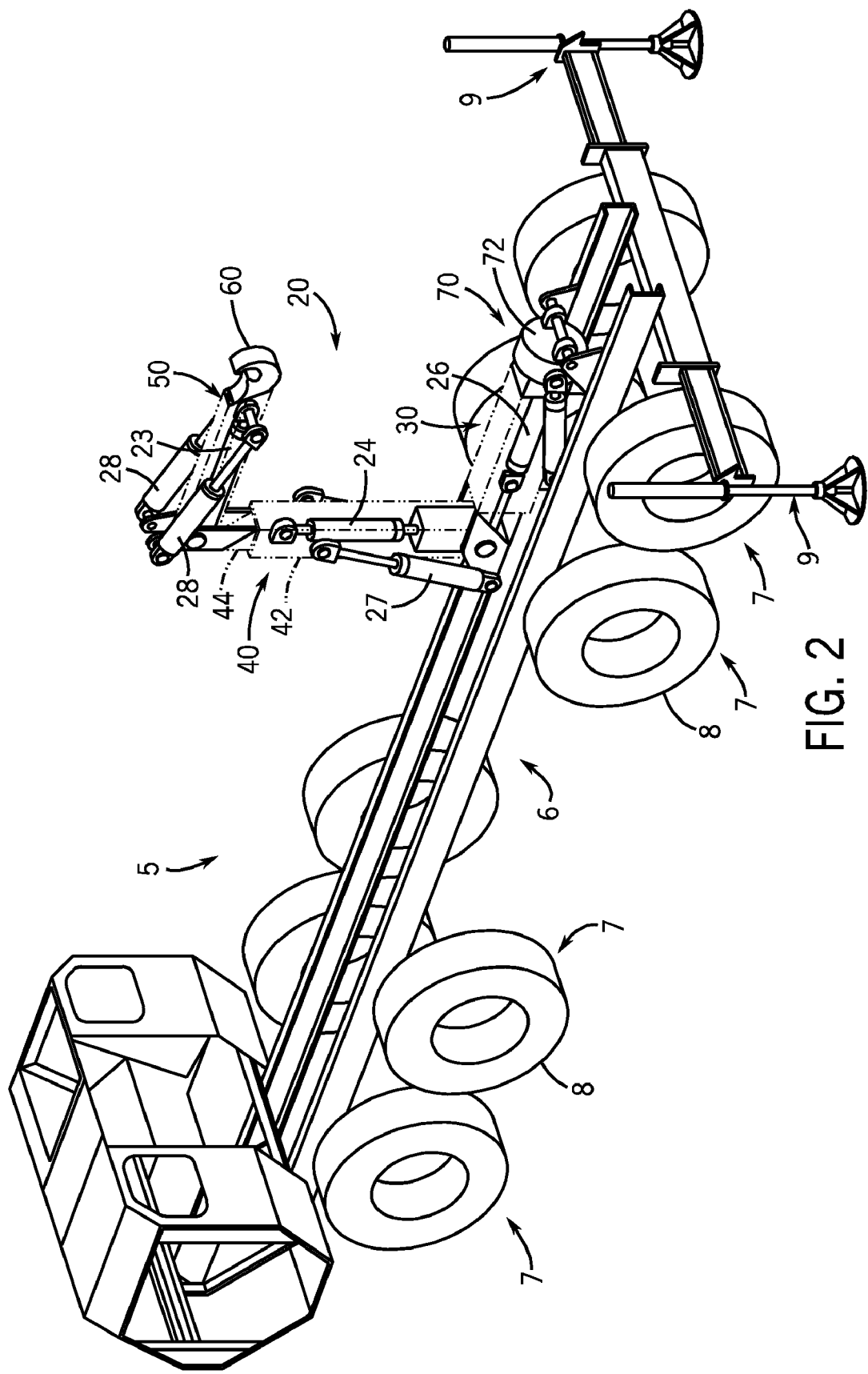
FIG. 2 is a perspective view of an exemplary embodiment of a rotatable and articulated material handling apparatus mounted on a vehicle.

FIG. 2 illustrates an exemplary embodiment of a material handling apparatus 20 as described above but including a rotation assembly 70 mounted between the riser portion 30 and the support structure 6 of the vehicle 5. The rotation assembly 70 allows the material handling apparatus 20 to rotate at least 360 degrees about the rotation bearing 72. Such rotation allows the material handling apparatus 20 to move to one or the other side of the vehicle 5 as illustrated in FIG. 5.

FIG. 2 illustrates the material handling apparatus 20 being coupled to the support structure 6 of the vehicle 5 at a fixed point. However, it should be understood that the rotation assembly 70 can be mounted to the support structure 6 on a movable apparatus that will translate along the longitudinal axis of the support structure 6 of the vehicle 5.

FIGS. 2-6 illustrate an outrigger assembly 9 deployed to provide stability to the vehicle 5. It should be understood that the use of an outrigger assembly 9 can include additional mechanisms coupled to the vehicle 5 as is necessary or suitable for stabilizing the vehicle 5 during operation. For example, additional outriggers can be located at the cab end of the vehicle, or they can be provided with articulated arms or other suitable apparatus.

Figure 3:
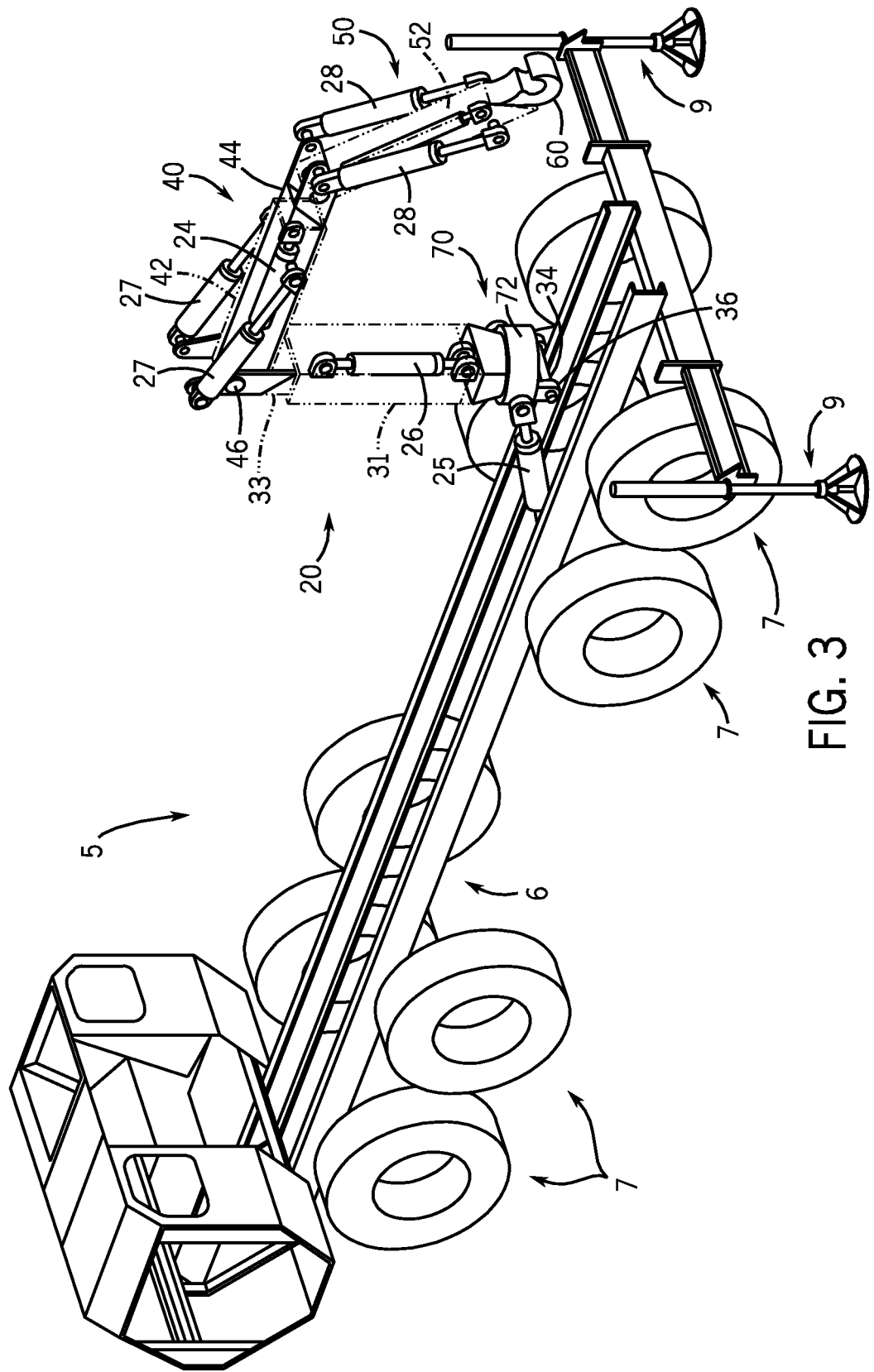
FIG. 3 is a perspective view of the material handling apparatus illustrated in FIG. 2 with a riser portion in a vertical position and a boom portion telescopically extended.
Figure 4:
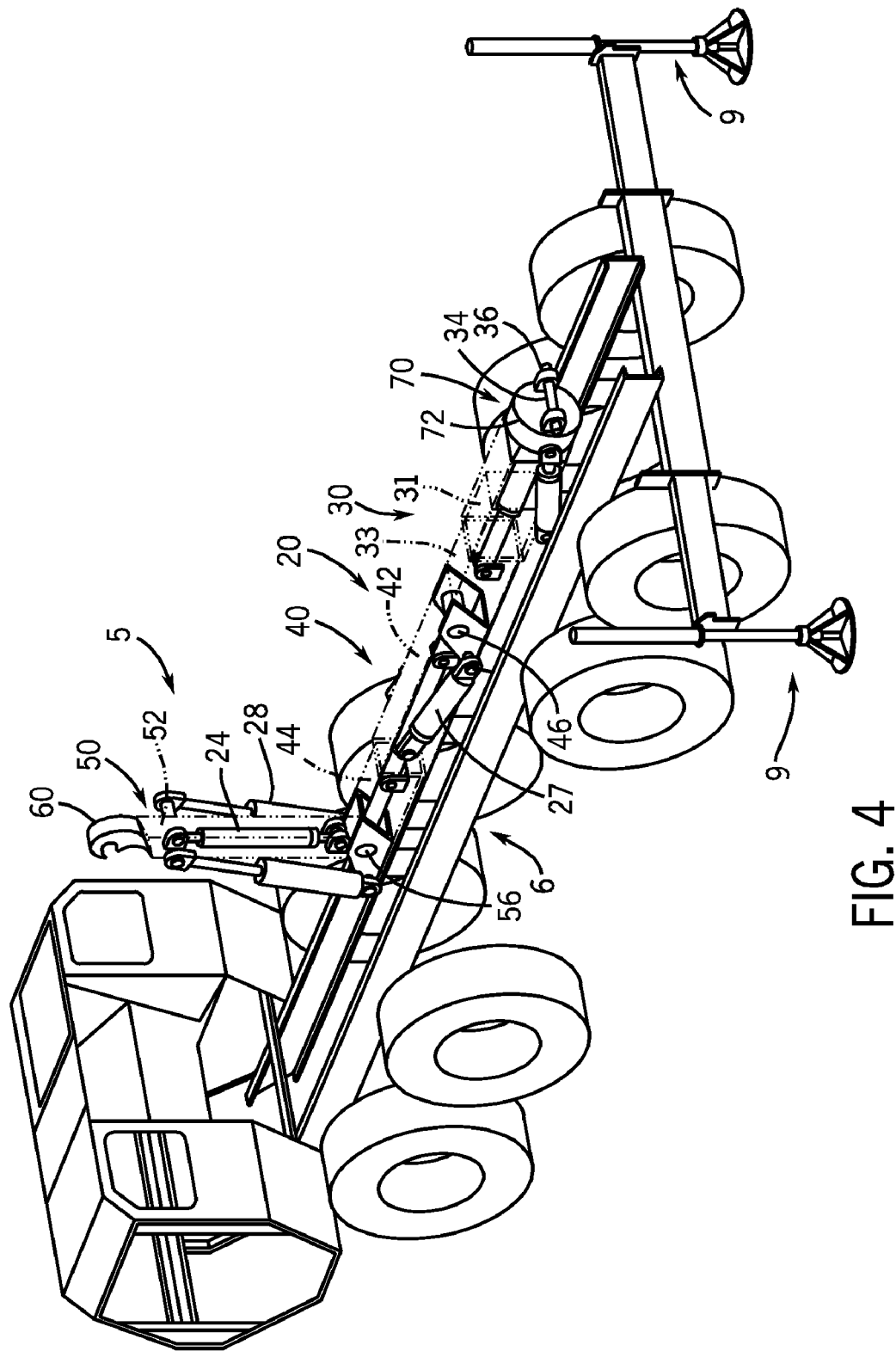
FIG. 4 is a perspective view of the material handling apparatus illustrated in FIG. 2 with the riser portion and boom portion in a horizontal position and each portion telescopically extended.
Figure 5:
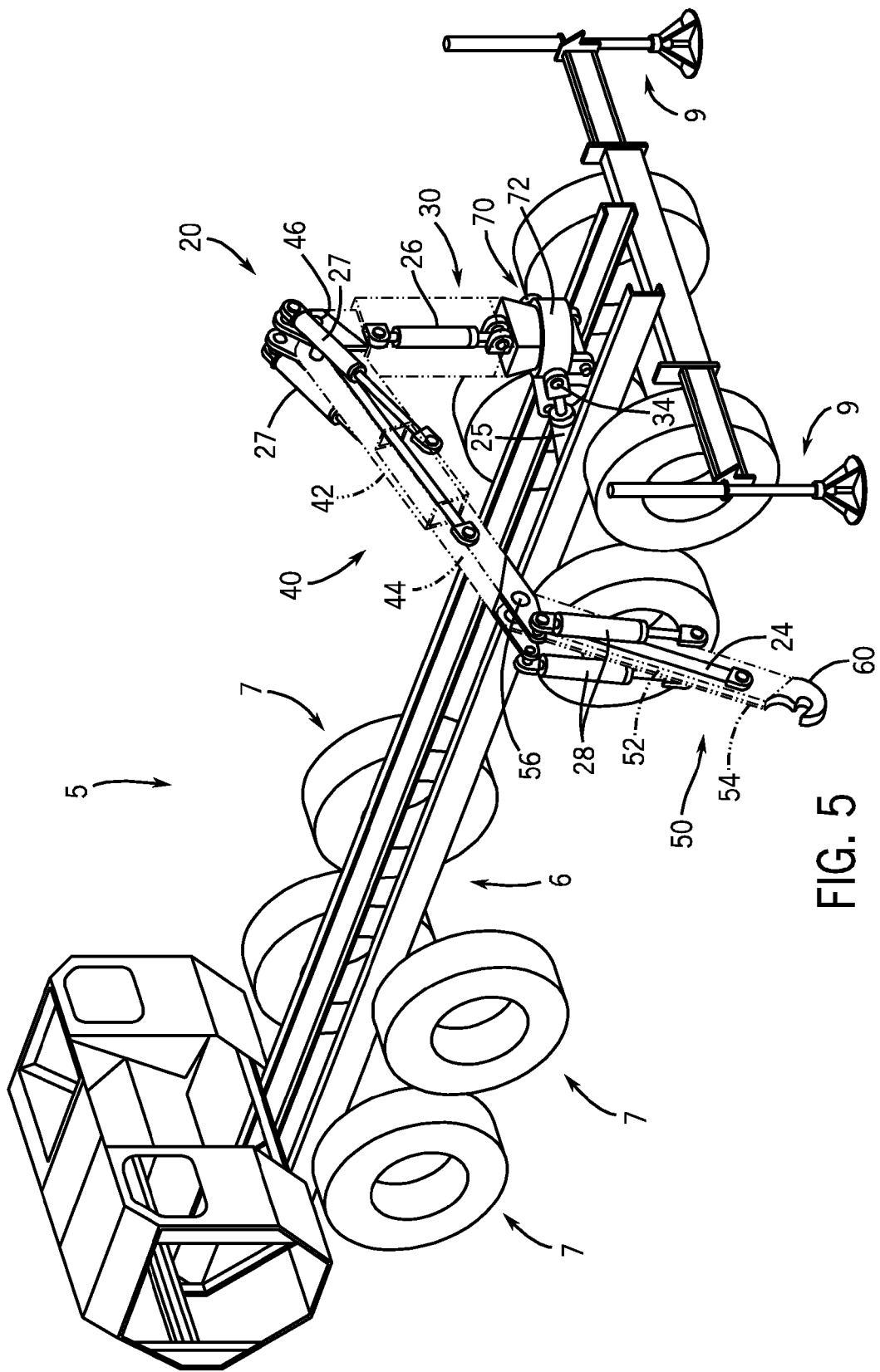
FIG. 5 is a perspective view of the material handling apparatus illustrated in FIG. 2 with the apparatus rotated to a side of the vehicle and with the boom portion extended.

FIGS. 3-5 illustrate various modes of operation of the material handling apparatus 20 including a telescopic operation of the riser portion 30, boom portion 40 and jib portion 50. It also illustrates an articulation of the jib and boom portions 50, 40.

FIG. 6 illustrates an exemplary embodiment of a material handling apparatus 20 mounted on a vehicle 5 and extending into a cargo space CS of an aircraft A. The boom portion 40 and jib portion 50 of the material handling apparatus 20 can be telescopically extended into the cargo space CS of the aircraft A to either push or pull cargo into or out of the aircraft A.

Other substitutions, modifications, changes and omissions may be made in the design, operating conditions and arrangement of the exemplary embodiments without departing from the spirit of the invention as expressed herein.

What is claimed is:

1. A land vehicle having a material handling apparatus, comprising:
   a support structure coupled to a plurality of weight bearing elements;
   a cab coupled to the support structure;
   a riser having a first telescopic actuator, the riser coupled to the support structure;
   a boom having a second telescopic actuator, the boom coupled to the riser;
   a jib having a third telescopic actuator, the jib coupled to the boom;
   a hook coupled to the jib;
   a first hydraulic actuator coupled to the support structure and the riser;
   a second hydraulic actuator coupled to the riser and the boom;
   a third hydraulic actuator coupled to the boom and the jib;
   a control apparatus coupled to the actuators and operable to move the riser, the boom, and the jib in a telescoping mode and an articulating mode to manipulate material coupled to the hook.

2. The land vehicle of claim 1, wherein the weight bearing elements comprise wheels.

3. The land vehicle of claim 1, wherein the control apparatus is operable from the cab.

4. The land vehicle of claim 1, including a fourth hydraulic actuator coupled to the jib and the hook and operable to articulate the hook.

5. The land vehicle of claim 1, wherein the telescopic actuators are selected from a group including a hydraulic machine, a pneumatic machine, and an electric motor.

6. The land vehicle of claim 1, wherein the control apparatus is operable at a location remote from the cab.

7. The land vehicle of claim 1, including an outrigger assembly coupled to the support structure.

* * * * *